(12) United States Patent
Wang

(10) Patent No.: US 9,618,979 B1
(45) Date of Patent: Apr. 11, 2017

(54) PORTABLE COMPUTING APPARATUS

(71) Applicants: Inventec (Pudong) Technology Corporation, Shanghai (CN); INVENTEC CORPORATION, Taipei (TW)

(72) Inventor: Hung-Sheng Wang, Taipei (TW)

(73) Assignees: Inventec (Pudong) Technology Corporation, Shanghai (CN); INVENTEC CORPORATION, Taipei (TW)

( * ) Notice: Subject to any disclaimer, the term of this patent is extended or adjusted under 35 U.S.C. 154(b) by 0 days.

(21) Appl. No.: 15/152,571

(22) Filed: May 12, 2016

(30) Foreign Application Priority Data

Nov. 27, 2015 (CN) .......................... 2015 1 0851623

(51) Int. Cl.
*G06F 1/16* (2006.01)
(52) U.S. Cl.
CPC .................................. *G06F 1/1683* (2013.01)
(58) Field of Classification Search
CPC ............................. G06F 1/1616; G06F 1/1654
See application file for complete search history.

(56) References Cited

U.S. PATENT DOCUMENTS

| | | | | |
|---|---|---|---|---|
| 2007/0091552 A1* | 4/2007 | Liang | ................... | G06F 1/1616 361/679.29 |
| 2010/0238620 A1* | 9/2010 | Fish | ..................... | G06F 1/1616 361/679.09 |
| 2013/0170126 A1* | 7/2013 | Lee | ....................... | G06F 1/1654 361/679.17 |
| 2013/0335925 A1* | 12/2013 | Lee | ....................... | G06F 1/1615 361/729 |
| 2014/0355190 A1* | 12/2014 | Yeh | ....................... | G06F 1/1669 361/679.17 |

* cited by examiner

*Primary Examiner* — Anthony Q Edwards
(74) *Attorney, Agent, or Firm* — CKC & Partners Co., Ltd.

(57) ABSTRACT

Portable computing apparatus includes a first component and a second component. The first component includes first connecting module having a first curved surface, which is convex. The second component includes second connecting module including a retaining portion and a groove portion having a second curved surface, which is concave. The retaining portion disposed adjacent to the groove portion can abut against the first curved surface. When the first connecting module is magnetically connected to the second connecting module, the first curved surface is slidably engaged to the second curved surface. When the first curved surface slides against the second curved surface, an angle between the first component and the second component continuously increase, the first component can rotate against the second component by pivoting around the retaining portion, so as to further separate the first curved surface from the second curved surface.

12 Claims, 5 Drawing Sheets

PORTABLE COMPUTING APPARATUS

RELATED APPLICATIONS

This application claims priority to Chinese Application Serial Number 201510851623.4, filed Nov. 27, 2015, which is herein incorporated by reference.

BACKGROUND

Field of Invention

The present disclosure relates to a portable computing apparatus. More particularly, the present disclosure relates to a detachable portable computing apparatus.

Description of Related Art

A detachable portable computing apparatus usually can be separated into several parts, such as a computing component, and an external input component . . . etc. Regarding a detachable portable computing apparatus that can be separated into two parts, a computing component and an external input component, as an example. Generally speaking, the computing component is usually designed for carrying independently and easily, as well as, easy assembling and disassembling with an external input component, the detachable portable computing apparatus may install compatible assembling features, such as a guide pin and a socket, on the external input component and the computing component respectively. For example, a guide pin installed on the external input component is configured to be inserted into a socket formed inside the computing component for coupling. Therefore, the compatible assembling features may enhance the coupling strength between the computing component and the external input component, to prevent the computing component separated from the external input component, and still can be disassembled through specific method.

However, the guide pin installed on the external input component is usually protruding from the external input component, and unable to be hidden or accommodated inside the structure of the external input component, which may result an unattractive appearance. Moreover, due to the coupling structures of the guide pin protruding outside the base, the guide pin may be easily bumped or hooked with others, when disassembling from the protective socket; furthermore, the guide pin bumped or hooked with others may be ruined or permanent deformed under an external force. Consequently, the available structure of a detachable portable computing apparatus, as described above, apparently exists with inconvenience and defect, which needs further improvement. To deal with aforesaid problem, practitioners of ordinary skill in the art have striven to attain a solution, still lacks a suitable solution to be developed. Therefore, to deal with aforesaid problem effectively is an important subject of research and development, and also a desired improvement in the art.

SUMMARY

The present disclosure provides a portable computing apparatus. The portable computing apparatus includes a first component and a second component. The first component includes first connecting module. The first connecting module includes a first curved surface which is convex. The second component includes second connecting module. The second connecting module includes a groove portion and a retaining portion. The groove portion has a second curved surface which is concave. The second curved surface is configured to engage the first curved surface. In some embodiments, a curvature of the second curved surface matches with a curvature of the convex first curved surface. The retaining portion is disposed adjacent to the groove portion, and configured to abut against the first curved surface. When the first connecting module is magnetically connected to the second connecting module, the first curved surface is slidably engaged with the second curved surface. When the first curved surface slides against the second curved surface to continuously increase an angle between the first component and the second component, the first component rotates against the second component by pivoting around the retaining portion, so as to further separate the first curved surface from the second curved surface.

It is to be understood that both the foregoing general description and the following detailed description are by examples, and are intended to provide further explanation of the invention as claimed.

BRIEF DESCRIPTION OF THE DRAWINGS

The disclosure can be more fully understood by reading the following detailed description of the embodiment, with reference made to the accompanying drawings as follows.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION

Figure 1:
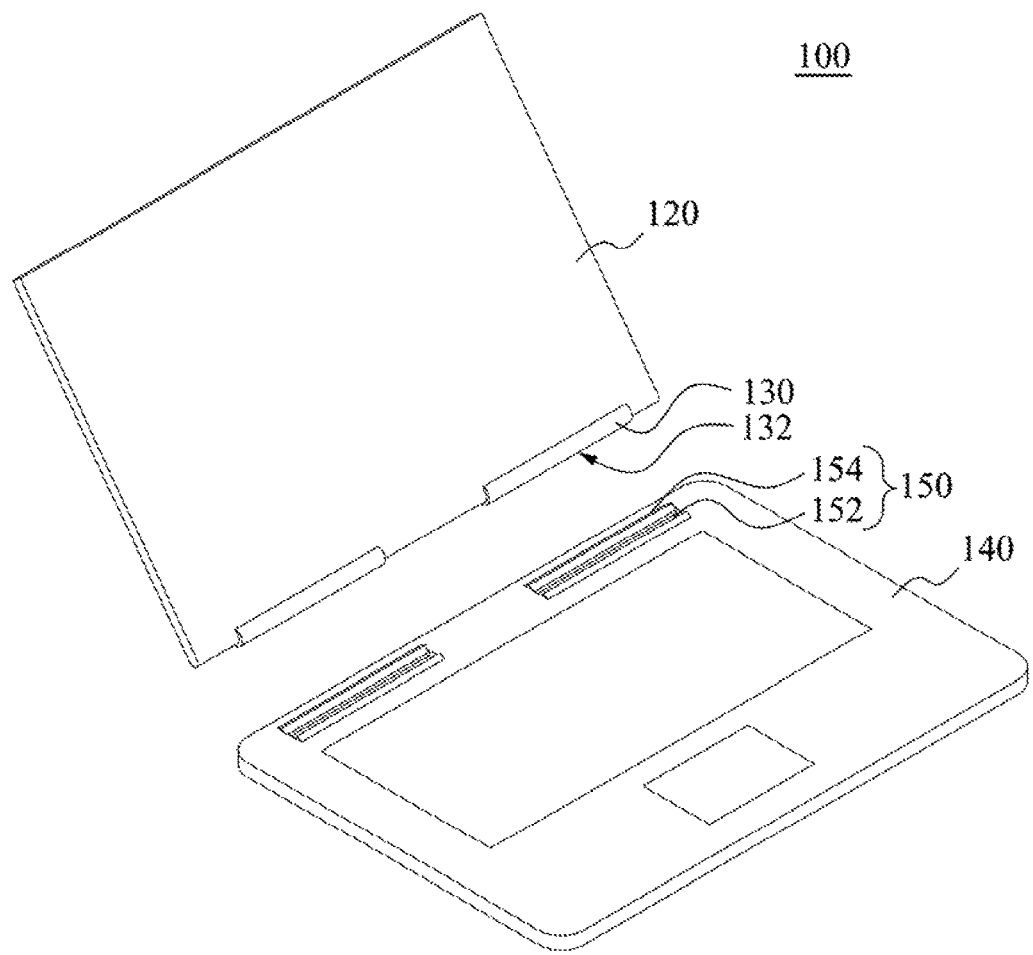
FIG. 1 is a three-dimensional perspective view of a portable computing apparatus according to an embodiment of the present disclosure.

Reference will now be made in detail to the present embodiments of the invention, examples of which are illustrated in the accompanying drawings. Wherever possible, the same reference numbers are used in the drawings and the description to refer to the same or like parts.

FIG. 1 illustrates a three-dimensional perspective view of a portable computing apparatus 100 according to an embodiment of the present disclosure. As shown in FIG. 1, the portable computing apparatus 100 includes a first component 120 and a second component 140. In some embodiments, the first component 120 can be a portable computing device, such as tablet personal computer (tablet PC), or other suitable portable computing device. In some embodiments, the second component 140 may include one or more input device, such as keyboard, touch sensing panel or other suitable controllable input device. In other embodiments, the first component 120 can be an input device, and the second component 140 can be a portable computing device. It should be understood, the first component 120 and the second component 140, described herein, is not intended to limit the present disclosure. The prerequisite of the portable computing apparatus 100 is that one of the first component 120 and the second component 140 should be a portable computing device, and another one should be an input device, which can work along with the portable computing device. However, for the convenience of carrying a portable computing device independently, the first component 120 is usually designated as a portable computing device in the following description.

Figure 2:
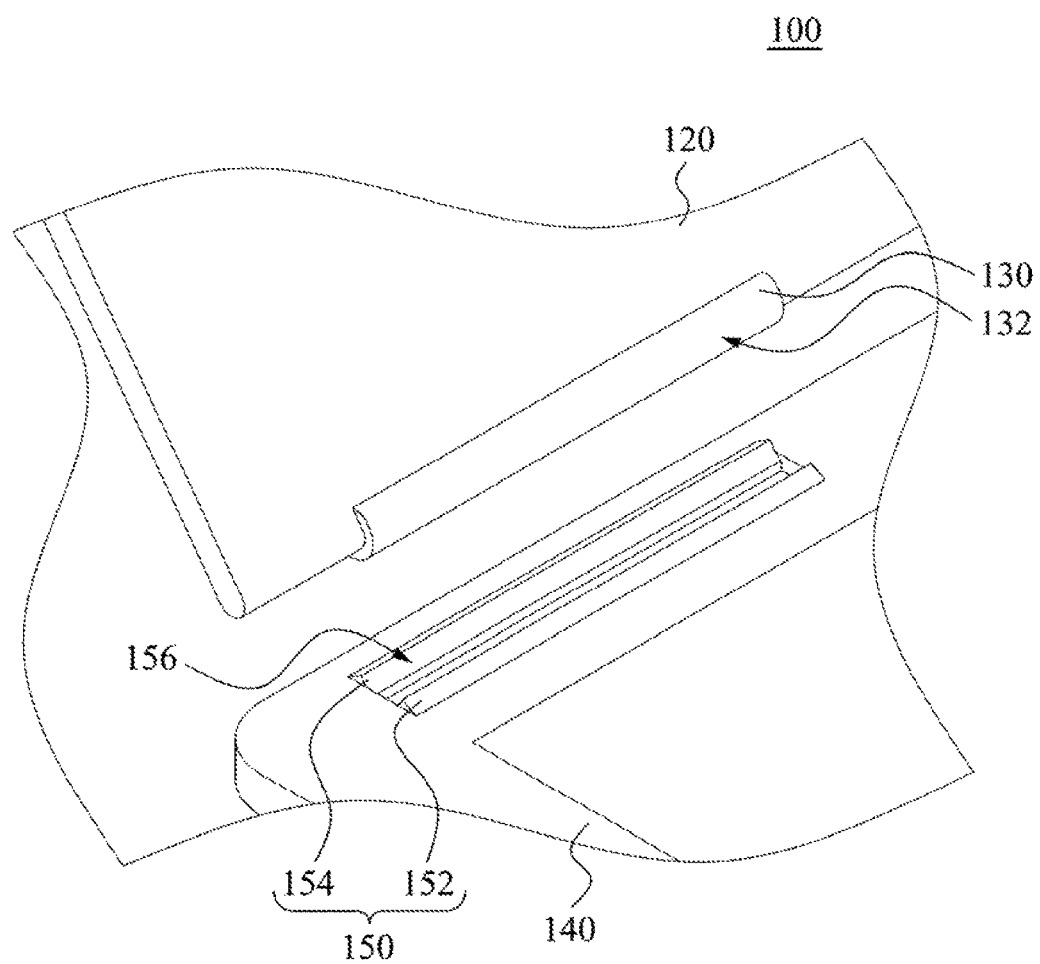
FIG. 2 is a partially schematic view of a portable computing apparatus, according to an embodiment of the present disclosure.

FIG. 2 illustrates a schematic view of a portable computing apparatus 100, in which the portable computing apparatus 100 in FIG. 1 is partially enlarged, according to an embodiment of the present disclosure. Referring to FIG. 2, the first component 120 includes at least one first connecting module 130. The first connecting module 130 includes a first curved surface 132, which is convex. In some embodiments, a longitudinal structure of the first connecting module 130 can be a partial circle, a partial oval, a partial parabola or other suitable curved surface. The second component 140 includes second connecting module 150. The second connecting module 150 includes a groove portion 152 and a retaining portion 154. The groove portion 152 has a second curved surface 156. In some embodiments, a curvature of the second curved surface 156 matches with a curvature of the convex first curved surface 132, such that the second curved surface 156 can be slidably engaged with the first curved surface 132. On the other hand, the curvature of the second curved surface 156 matched with the curvature of the convex first curved surface 132 means that a curvature radius of the second curved surface 156 is substantially matched with a curvature radius of the convex first curved surface 132, and the second curved surface 156 has a greater cross-sectional area comparing to the convex first curved surface 132. Therefore, when the first connecting module 130 is connected to the second connecting module 150, at least a part of the first curved surface 132 protruding from the first component 120 can be accommodated within a space formed by the second curved surface 156. When the first curved surface 132 slides relative to the second curved surface 156, different parts of the first curved surface 132 may remain being accommodated within a space formed by the second curved surface 156. That is, in other embodiments, the curvature of the second curved surface 156 can also be partially matched with the curvature of the convex first curved surface 132, which could be adjusted to actual demand by those skilled in the art without departed from the scope or the spirit of the present disclosure.

In some embodiments, the first connecting module 130 can be magnetically connected to the second connecting module 150. When the first connecting module 130 is magnetically connected to the second connecting module 150, the first component 120 can be rotated relative to the second component 140 in the manner that sliding the first curved surface 132 relative to the second curved surface 156, and fastening the first component 120 at arbitrary angle within a limited range. It should be noted that, the prerequisite of the magnetic force exerted between the magnetically connected first curved surface 132 and the second curved surface 156 is that, the first curved surface 132 can be magnetically attracted by the second curved surface 156, and a component of the normal force, correspondingly generated along a direction parallel to the first component by the magnetic force and the gravity force, can correspondingly generate a frictional force adequately to balance the gravity force and a torque generated by the gravity force, exerted on the first component 120. The connecting relation between the first connecting module 130 and the second connecting module 150, described herein, is only an exemplary, could be adjusted to actual demand by those skilled in the art without departed from the scope or the spirit of the present disclosure.

In some embodiments, the retaining portion 154 is disposed adjacent to the groove portion 152, and slightly protruding from a surface of the second component 140 relative to the groove portion 152. The retaining portion 154 is configured to abut against the convex first curved surface 132. When the first curved surface 132 slide against the second curved surface to make an angle between the first component 120 and the second component 140 continuously increase, the first component 120 is configured to rotate against the second component 140 until the first component 120 abutted against the retaining portion 154, and then use the retaining portion 154 as a pivot for further rotating to separate the first curved surface 132 from the second curved surface, and increase a distance between the first curved surface 132 and the second curved surface 156. Therefore, the increasing distance between the first curved surface 132 and the second curved surface 156 may reduce the magnetic force to disconnect the first component 120 and the second component 140, so that the first component 120 can be separated from the second component 140.

It's should be noted that, in some embodiments, the first connecting module 130 and the second connecting module 150 can both have permanent magnet, or one of the first connecting module 130 and the second connecting module has permanent magnet and another one has temporary magnet under magnetic induction. For example, in part of embodiments, both the first connecting module 130 and the second connecting module 150 have permanent magnet, and magnetic poles of the first connecting module 130 and the second connecting module 150 correspondingly have opposite poles, so that the first connecting module 130 can be magnetically connected with the second connecting module 150.

For example, in part of embodiments, the second connecting module 150 has permanent magnetic properties, and the first connecting module 130 can be composed of a magnetisable material, such as a ferromagnetic material. Therefore, when the first connecting module 130 approaches the second connecting module 150, the first connecting module 130 can be magnetically inducted to generate corresponding temporarily magnetic poles, and further magnetically connected to the second connecting module 150. The first connecting module 130, described in the present embodiments, can avoid the first connecting module 130 magnetically attracted or repelling other devices disposed with temporary magnetic material comparing to the first connecting module 130 having permanent magnetic properties. On the other hand, the first connecting module 130 having temporary magnetic properties can eliminate the inconvenience of magnetically attracting or repelling other devices disposed with temporary magnetic material. Furthermore, only the second connecting module 150 having permanent magnetic properties, instead of both the first connecting module 130 and the second connecting module 150 having permanent magnet, can avoid or prevent the first connecting module 130 being magnetically repelled from the second connecting module 150 when the permanent magnetic poles of the first connecting module 130 and the second connecting module 150 are unmatched during connection, in which the connecting relation between the first connecting module 130 and the second connecting module 150 is restricted with a certain direction or within a limited angle, which would reduce the flexibility of connecting the first connecting module 130 to the second connecting module 150. That is to say, when the second connecting module 150 has permanent magnetic properties, and the first connecting module 130 is made from the magnetisable material, the first connecting module 130 can be magnetically connected to the second connecting module 150 under substantially arbitrary directions or angles. The prerequisite of the first connecting module 130 and the second connecting module 150 in the present embodiments is that, the first connecting module 130 can be magnetically inducted to generate opposite magnetic poles by the second connecting module 150, and a proper magnetic force can be generated between the first connecting module 130 and the second connecting module 150 within a certain distance, in which the magnetic force can maintain the first component 120 connecting to the second component 140.

Due to the portable computing apparatus 100 utilizes the magnetic force for connecting the first component 120 to the second component 140, consequently, the compatible assembling features of the prior art, such as guide pins or corresponding sockets, can be replaced by the smooth convex first connecting module 130 and the concave second connecting module 150 in the portable computing apparatus 100. Therefore, the portable computing apparatus 100 may prevent the first connecting module 130 and the second connecting module 150, forming the connection between the first component 120 and the second component 140, being bumped or hooked by a foreign matter, such that the first connecting module 130 and the second connecting module 150 can avoid or reduce being ruined or deformed. Moreover, due to an external force exerted on the first component 120 or the second component 140 of the portable computing apparatus 100 is only restricted to break the magnetic connection between first connecting module 130 and the second connecting module 150, and separate the first connecting module 130 from the second connecting module 150, instead of damaged coupling or hooking structures to ruin or malfunction connecting modules. That is, when the first connecting module 130 is connected to the second connecting module 150, the detachable magnetic connection of the first connecting module 130 and the second connecting module 150 may also avoid structural deformation or break of the first connecting module 130 and the second connecting module 150 under a external force.

Besides, due to the portable computing apparatus 100 may increase the distance between the first connecting module 130 and the second connecting module 150 through the retaining portion 154 disposed on the second connecting module 150 of the second component 140, in which the first component 120 is abutted against the retaining portion 154, and rotated, so that the attracted magnetic force between the first connecting module 130 and the second connecting module 150 keeps decreasing until the magnetic force is unable to maintain the connecting relation, subsequently, the first component 120 can be separated from the second component 140. Therefore, the first component 120 can be assembled to or separated from the second component 140 without using any assisted equipment or a complex detachable method. As a consequence, the portable computing apparatus 100 has an advantage of easy assembling and disassembling.

Figure 3:
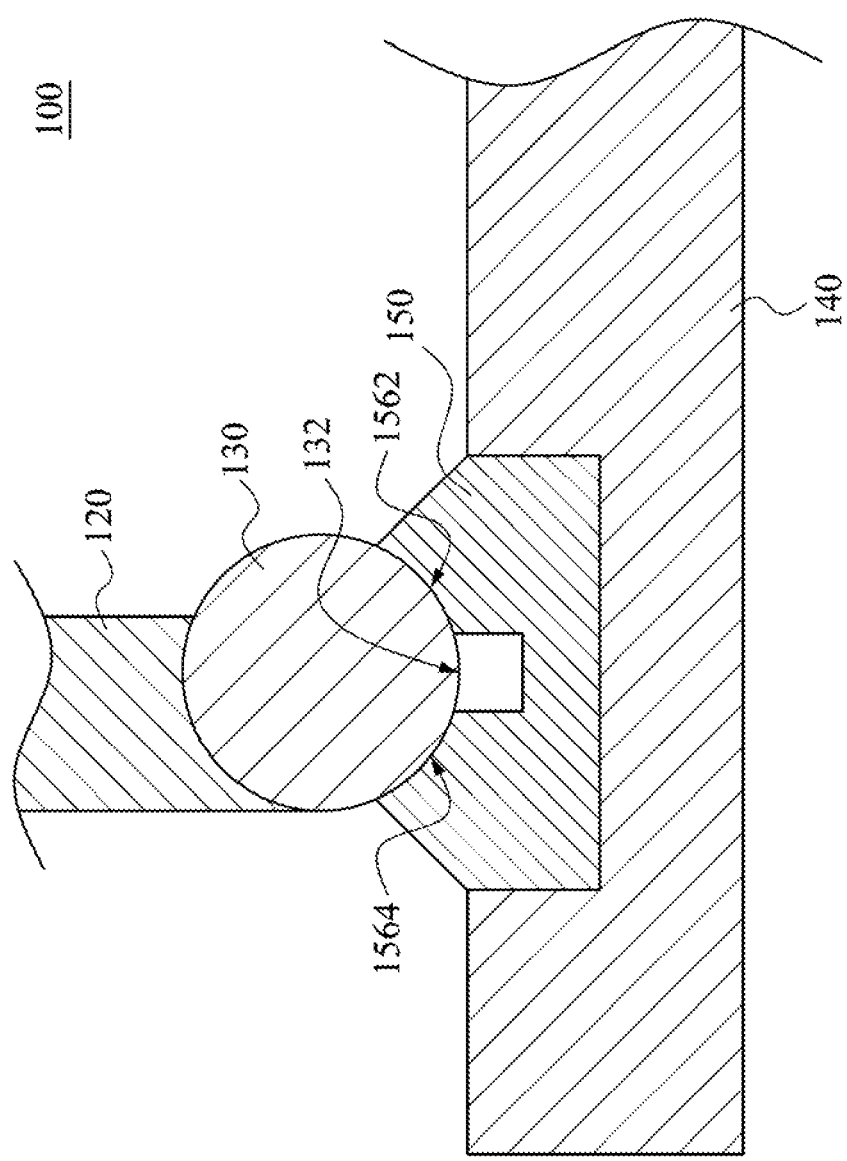
FIG. 3 to FIG. 5 are schematically longitudinal sectional views of a portable computing apparatus, according to an embodiment of the present disclosure.

FIG. 3 illustrates a schematically longitudinal sectional view of a portable computing apparatus 100, according to an embodiment of the present disclosure. As shown in FIG. 3, in some embodiments, the second curved surface 156 may have a first portion 1562 and a second portion 1564. The first portion 1562 and the second portion 1564 are respectively located at two sides of the second curved surface 156, collectively formed the second curved surface 156, and having magnetism. The first portion 1562 and the second portion 1564 both have permanent magnetic properties. When the first connecting module 130 is connected to the second connecting module 150, the first connecting module 130 can be contacted with and magnetically connected to the first portion 1562 and the second portion 1564 respectively. In some embodiments, two sides of the first curved surface 132 in the first connection module 130 located within the groove portion 152 is respectively magnetically inducted as temporary magnet for connecting the first connecting module 130 to the second connecting module 150. In part of embodiments, the first portion 1562 and the second portion 1564 may respectively have opposite magnetic properties comparing to the first connecting module 130, and be magnetically connected to the first connecting module 130. When the first connecting module 130 is connected to the second connecting module 150, the first connecting module 130 is engaged with the second connecting module 150 at the first portion 1562 and the second portion 1564.

In some embodiments, the first portion 1562 and the second portion 1564 of the second curved surface 156 can have opposite magnetic poles through depositing magnetic materials in inner sides of the first portion 1562 and the second portion 1564. For example, in some embodiments, when the first portion 1562 has a north pole of the magnet, the second portion 1564 has a south pole of the magnet. For example, in some other embodiments, when the first portion 1562 has a south pole of the magnet, the second portion 1564 has a north pole of the magnet. Due to the magnetic material is mostly deposited in the first portion 1562 and the second portion 1564, so that a magnetic field is mostly generated between the first portion and the second portion. A magnetic field intensity along a direction leaving away from a surface of the second component 140 disposed with the second connecting module 150 is greater than a magnetic field intensity along a direction substantially parallel to the surface of the second component 140 disposed with the second connecting module 150.

It should be noted that, the magnetic arrangements of the first portion 1562 and the second portion 1564, described herein, are only exemplary, and not intended to limit the present disclosure. It should be understood that, the first portion 1562 and the second portion 1564 may respectively have two magnetic poles or other suitable magnetic arrangement, which could be adjusted to actual demand by those skilled in the art without departed from the scope or the spirit of the present disclosure. The prerequisite of the first portion 1562 and the second portion 1564 is that, the first portion 1562 and the second portion 1564 can magnetically induct two sides of the first connecting module 130 to induce temporary magnet, or the first portion 1562 and the second portion 1564 can respectively have opposite magnetic poles corresponded to the first connecting module 130 having permanent magnetic properties.

The second connecting module 150 fabricated by depositing magnetic materials in inner sides or other suitable fabricating process, may have opposite magnetic poles formed on the first portion 1562 and the second portion 1564, to increase lines of magnetic flux generated within the groove portion 152, and moreover, to enhance the magnetic connection between the first connecting module 130 and the second connecting module 150. The portable computing apparatus 100, described herein, is more appropriate to adopt a first connecting module 130 having temporarily magnetic properties, such as ferromagnetic material. That is, When the first connecting module 130 approaches the groove portion 152 of the second connecting module 150, owing to the lines of magnetic flux are more greatly generated inside the groove portion 152, the first connecting module may endure a stronger magnetic induction, and generate a greater magnetic force. In the meanwhile, due to most of the lines of magnetic flux are generated within the groove portion 152 and from the groove portion 152 along a direction away from a surface of the second component 140 disposed with the second connecting module 150. Therefore, foreign matters located outside the second connecting module 150 would only be slightly influenced by the magnetic field between the groove portion 152, in which the second connecting module 150 can avoid attracting the foreign matters having magnetic properties.

Figure 4:
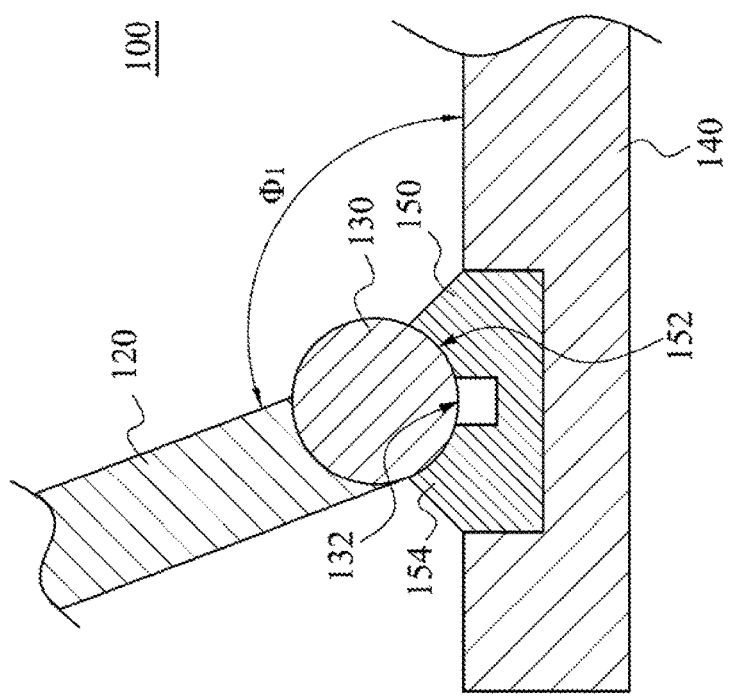

FIG. 4 illustrates a schematically longitudinal sectional view of a portable computing apparatus 100, when the first component 120 is abutted against the retaining portion 154 of the second component 140, according to an embodiment of the present disclosure. In some embodiments, the retaining portion 154 is disposed between the groove portion 152 and an edge of the second component 140 proximal to the groove portion 152. When the first connecting module 130 is abutted against the retaining portion 154, an angle between the first component 120 and the surface of the second component 140 disposed with the second connecting module 150 is defined as a maximum restricted angle θ1. When the first connecting module 130 is connected to the second connecting module 150, an angle between the first component 120 and a surface of the second component 140 disposed with the second connecting module 150 is lesser or equal to the maximum restricted angle θ1. In some embodiments, the maximum restricted angle θ1 is about 135 degree. In some embodiment, the maximum restricted angle θ1 is greater than 90 degree.

Figure 5:
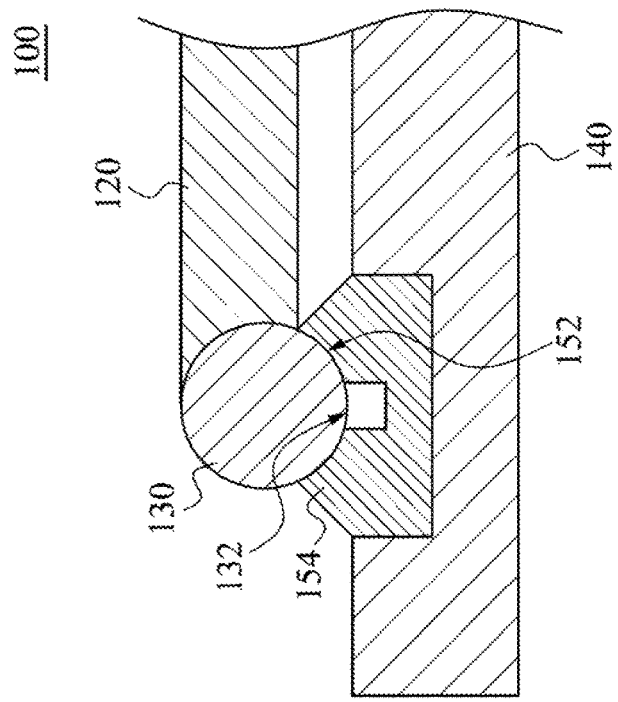

FIG. 5 is a schematically longitudinal sectional view of a portable computing apparatus 100, when a first component 120 is closed to the second component 140, according to an embodiment of the present disclosure. When the first curved surface 132 slides against and relative to the second curved surface 156 to make an end of the first component 120 away from the first connecting module 130 approach to the second component 140 and make the angle between the first component 120 and the second component 140 be smaller than a minimum restricted angle (not shown), the first curved surface 132 would continuously slide relative to the second curved surface 156, until a surface of the first component 120 proximal to the second component 140 contacts a surface of the second component 140 disposed with the second connecting module 150. In some embodiments, the minimum restricted angle is about 45 degree. In some embodiments, the minimum restricted angle depends on the magnetic force between the first connecting module 130 and the second connecting module 150.

In some embodiments, the first component 120 may transmit a signal to the second component 140 through wireless communication. In some embodiments, the wireless communication communicated between the first component 120 and the second component 140 can include bluetooth communication protocol, infrared communication protocol, Wi-fi communication protocol or other suitable wireless communication protocol.

Figure 6:
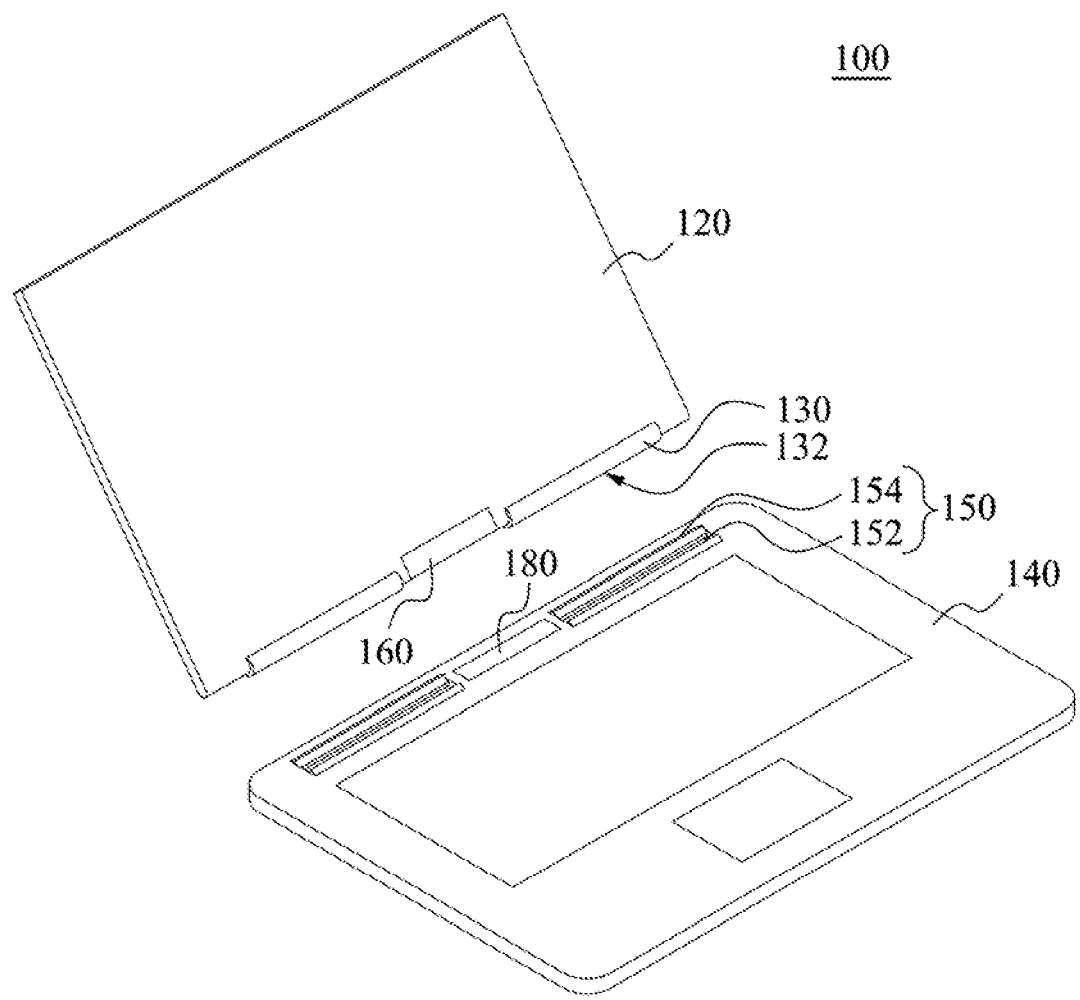
FIG. 6 is a three-dimensional perspective view of a portable computing apparatus, according to another embodiment of the present disclosure.

FIG. 6 is a three-dimensional perspective view of a portable computing apparatus 100, according to another embodiment of the present disclosure. In some other embodiments, the first component 120 may transmit a signal to the second component 140 through electrically connected communication.

In some embodiments, the first component 120 may include two of the first connecting modules 130. The first connecting modules 130 are disposed at two ends of an edge of the first component 120 respectively. The second component 140 may include two of the second connecting modules 150. The second connecting modules 150 are disposed at two ends of the second component 140 respectively, and corresponded to the first connecting modules 130.

In some embodiments, the first component 120 may further include a first transceiver module 160 disposed between the two first connecting modules 130. The second component 140 may further include a second transceiver module 180 disposed between the two second connecting modules 150. When the first component 120 is connected to the second component 140, the first component 120 is electrically connected to the second transceiver module 180 of the second component 140 through the first transceiver module 160. In some embodiments, the first transceiver module 160 can be a metal electrode, or other suitable electrode. In some embodiments, the second transceiver module 180 can have a structure like Pogo pin, or other suitable structure. In some embodiments, the second transceiver module 180 may have a varied length to keep electrically connected with the first transceiver module 160. The varied length of the second transceiver module 180 may be prolonged or shorten depend on a distance between the first transceiver module 160 and the second transceiver module 180, in order to keep the second transceiver module 180 being electrically connected to the first transceiver module 160.

Summarized from the above, the present disclosure provides a portable computing apparatus. The portable computing apparatus includes a first component and a second component. The first component includes first connecting module. The first connecting module includes a first curved surface, which is convex. The second component includes second connecting module. The second connecting module includes a groove portion and a retaining portion. The groove portion has a second curved surface, which is concave. A curvature of the second curved surface matches with a curvature of the first curved surface. The retaining portion is disposed adjacent to the groove portion, and configured to abut against the first curved surface. When the first connecting module is magnetically connected to the second connecting module, the first curved surface is slidably engaged to the second curved surface. When the first curved surface slides against the second curved surface to continuously increase an angle between the first component and the second component, the first component is configured to rotate against the second component by pivoting around the retaining portion, so as to further separate the first curved surface from the second curved surface.

Although some embodiments of the present disclosure and their advantages have been described in detail, it should be understood that various changes, substitutions, and alterations can be made herein without departing from the spirit and scope of the disclosure as defined by the appended claims. For example, it will be readily understood by those skilled in the art that many of the features, functions, processes, and materials described herein may be varied when remaining within the scope of the present disclosure. Moreover, the scope of the present application is not intended to be limited to the particular embodiments of the process, machine, fabricate, composition of matter, means, methods, and steps described in the specification. As one of ordinary skill in the art will readily appreciate from the disclosure of the present disclosure, processes, machines, fabricate, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, fabricate, compositions of matter, means, methods, or steps.

What is claimed is:

1. A portable computing apparatus, comprising:
   a first component comprising at least one first connecting module, the first connecting module comprising a first curved surface that is convex; and
   a second component comprising at least one second connecting module, the second connecting module comprising:
      a groove portion having a second curved surface that is concave, the second curved surface is configured to engage the first curved surface; and
      a retaining portion disposed adjacent to the groove portion and configured to abut against the first curved surface,
   wherein when the first connecting module is magnetically connected to the second connecting module, the first curved surface is slidably engaged with the second curved surface, and
   when the first curved surface slides against the second curved surface to continuously increase an angle between the first component and the second component, the first component rotates against the second component by pivoting around the retaining portion, so as to further separate the first curved surface from the second curved surface.

2. The portable computing apparatus of claim 1, wherein a curvature of the second curved surface matches with a curvature of the first curved surface.

3. The portable computing apparatus of claim 1, wherein when the first connecting module is connected to the second connecting module, at least a part of the first curved surface is accommodated within a space formed by the second curved surface.

4. The portable computing apparatus of claim 1, wherein the second curved surface has a first portion and a second portion respectively located at two sides of the second curved surface and having magnetism, when the first connecting module is connected to the second connecting module, the first connecting module is contacted with and magnetically connected to the first portion and the second portion respectively.

5. The portable computing apparatus of claim 4, wherein the first portion and the second portion of the second curved surface have opposite magnetic poles, a magnetic field is generated between the first portion and the second portion, a magnetic field intensity along a direction leaving away from a surface of the second component disposed with the second connecting module is greater than a magnetic field intensity along a direction substantially parallel to the surface of the second component disposed with the second connecting module.

6. The portable computing apparatus of claim 1, wherein the retaining portion is disposed between the groove portion and an edge of the second component proximal to the groove portion.

7. The portable computing apparatus of claim 6, wherein when the first connecting module is abutted against by the retaining portion, an angle between the first component and a surface of the second component disposed with the second connecting module is defined as a maximum restricted angle, wherein when the first connecting module is connected to the second connecting module, an angle between the first component and the surface of the second component disposed with the second connecting module is smaller or equal to the maximum restricted angle.

8. The portable computing apparatus of claim 1, wherein when the first curved surface slides against the second curved surface to make an end of the first component away from the first connecting module approach the second component and make the angle between the first component and the second component be smaller than a minimum restricted angle, the first curved surface is configured to continuously slide relative to the second curved surface, until a surface of the first component proximal to the second component contacts a surface of the second component disposed with the second connecting module.

9. The portable computing apparatus of claim 1, wherein the first component transmits a signal to the second component through wireless communication.

10. The portable computing apparatus of claim 1, wherein the first component transmits a signal to the second component through electrically connected communication.

11. The portable computing apparatus of claim 1, wherein the first component comprises two of the first connecting modules disposed at two ends of an edge of the first component respectively, and the second component comprises two of the second connecting modules disposed at two ends of the second component respectively, and the second connecting modules are corresponded to the first connecting modules.

12. The portable computing apparatus of claim 11, wherein the first component further comprises a first transceiver module disposed between the first connecting modules, the second component further comprises a second transceiver module disposed between the second connecting modules, wherein when the first component is connected to the second component, the first transceiver module is electrically connected to the second transceiver module.

* * * * *